May 15, 1956   J. D. MORGAN   2,745,678
VEHICLE ORNAMENT PROTECTOR
Filed Nov. 23, 1953
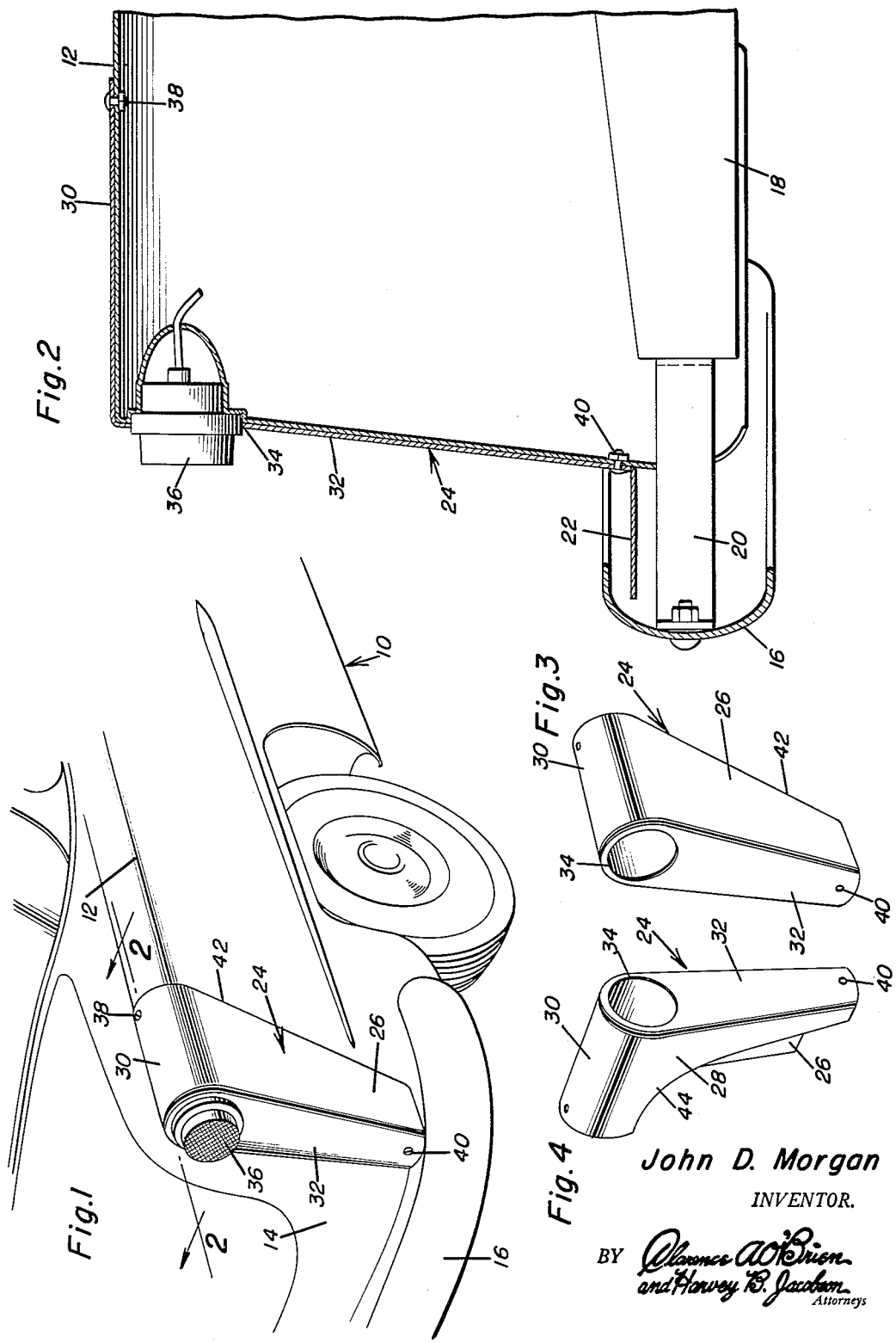
John D. Morgan
INVENTOR.

2,745,678

VEHICLE ORNAMENT PROTECTOR

John D. Morgan, Smithfield, N. C.

Application November 23, 1953, Serial No. 393,747

2 Claims. (Cl. 280—152)

This invention relates in general to improvements in accessories for vehicle bodies, and more specifically to an ornament and protector for rear fenders of vehicles.

At the present time, manufacturers of automobiles are utilizing a large amount of ornamental trim on their vehicles in order to enhance the appearance thereof. While a great deal of ornamental trim, such as grills, front bumpers, etc., is utilized on the front of a vehicle, a relatively small amount of ornamental trim has been utilized on the rear portion of a vehicle. While it is to be understood that it is not the automotive manufacturers' intentions to use as little ornamental trim on the rear portion of a vehicle, the average vehicle does not have its proportionate amount of ornamental trim on the rear part thereof. This is primarily due to the failure on the part of the automotive designers to find a suitable place for such ornamental trim. In addition, due to parallel-curb parking, rear portions of most car fenders are generally susceptible to dents thereon due to carelessness, misjudgment of the driver or due to inexperienced drivers.

It is therefore the primary object of this invention to provide an improved vehicle ornament which may be attached to a rear portion of a vehicle to enhance the appearance of such vehicle.

Another object of this invention is to provide an improved vehicle ornament which may be quickly and easily attached to rear fenders of existing vehicles so as to enhance the appearance of the rear portions thereof.

A further object of this invention is to provide an improved ornamental trim for rear parts of rear fenders, the ornamental trim being formed of readily obtainable materials and being simple in construction whereby they are economically feasible.

A further object of the invention is to provide an improved ornament attachment and rear fender guard which abuts a horizontal splash pan, covers a substantial portion of the outer rear portion of a vehicle fender and conforms to the curvature between trunk deck and inner rear portion of a vehicle for improving the appearance of the vehicle body and protecting that portion of the vehicle rear fender which is normally susceptible to parking damage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a rear portion of an automobile now on the market and shows the rear part of the rear fender thereof being provided with an ornamental trim protector, the ornamental trim protector being the subject of this invention;

Figure 2 is an enlarged fragmentary longitudinal vertical sectional view taken substantially upon the plane indicated by the section line 2—2 of Figure 1 and shows the general relationship of the ornamental trim protector with respect to its associated rear fender.

Figure 3 is a perspective view of the ornamental trim protector of Figure 1 and shows the same removed from the vehicle; and Figure 4 is a slightly rotated rear perspective view of the ornamental trim protector of Figures 1 and 3, and shows the general shape of the inner side thereof.

Referring now to the drawings in detail, it will be seen that there is illustrated in Figure 1 a vehicle which is referred to in general by the reference numeral 10. The vehicle 10 is of a conventional make now on the market and includes an elongated rear fender 12. The vehicle 10 also includes a trunk deck 14 and a rear bumper 16. The rear bumper 16 is secured to the frame 18 of the vehicle by suitable mounting brackets 20 and is spaced rearwardly of the rear portion of the rear fender 12. Hiding the mounting brackets 20 of the bumper 16 is a splash pan 22.

Carried by the rear part of the fender 12 and enclosing the same is the vehicle ornament protector which is the subject of this invention, the vehicle ornament protector being in the form of a vehicle trim which is referred to in general by the reference numeral 24. The vehicle trim protector 24 is contoured so as to conform to the shape of the rear part of the fender 12. It will be seen that the vehicle trim 24 includes an outer side 26 and an inner side 28, the sides being connected at their upper edges by a curved top wall 30 and at their rear edges by a slightly rounded rear wall 32. It will be noted that the rear wall 32 is provided adjacent its upper end with an enlarged opening 34. The opening 34, when the vehicle trim protector 24 is in position on the fender 12, receives the tail light assembly 36 of the fender 12.

In order that the vehicle trim 24 may be secured in position on the fender 12, there is provided a first fastener 38 which extends downwardly through the front part of the top wall 30. A second fastener 40 extends horizontally through the lower part of the rear wall 32. The fasteners 38 and 40 pass through associated portions of the fender 12 and secure the cover 24 in place.

It will be noted that the outer side wall 26 is provided with a downwardly and rearwardly sloping forward edge 42. This forward edge is so configurated to conform to the modern lines of a vehicle body as to be ornamental in shape. The forward edge 44 of the inner side wall 28 is generally curved in outline, and is contoured to conform to the outer surface of the trunk deck 14.

It will be understood that the vehicle trim 24, although specifically designed in the present instance for the fender 12, may vary slightly in contour so as to be employed with all fenders similar to the fender 12. As must be fully realized, the fenders of various makes of cars vary slightly in shape and size and it is the intention of this invention to provide vehicle trim protector, such as the vehicle trim 24, for all types of fenders. Also, it will be understood that the rear walls of the vehicle trim protectors may be provided with different arrangements of openings for receiving tail light assemblies.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. The combination of a vehicle body comprising a rear fender having a rearwardly extending raised curved end surface terminating in a curved top surface portion, both of the aforementioned surfaces being joined to an outer side surface, and an inner side surface, the inner side surface being in abutting relation to a transversely extending curved trunk deck surface, the curved end surface abutting a substantially horizontal splash pan secured to the vehicle body, tail light means on the curved end surface of said fender, an attachable rear fender trim-protector having a curved end surface terminating in a curved top surface, the curved end surface including a portion providing an opening to conform with the exact configuration of said tail light means and being of the same length as the rear end surface of said fender for terminating in juxtaposition to said splash pan, the curved end and top surfaces terminating in outer and inner side surfaces, the outer side surface terminating in a downwardly and rearwardly extending annular edge portion joined to the portion of the end surface in juxtaposition to said splash pan, the inner side surface terminating in a rearwardly curved edge portion connected to the portion of the end surface in juxtaposition to said splash pan, said curved edge portion conforming to the configuration between the inner side surface of said fender and the trunk deck of said vehicle body, each of the surfaces of the trim-protector forming to a comparable surface on said rear fender to provide an ornamental and protective end cap therefor, and means on said trim-protector and rear fender for detachably securing said trim-protector in flush engagement on said rear fender.

2. The combination as set forth in claim 1 wherein said trim-protector comprises a highly decorative and corrosion resistant surface.

References Cited in the file of this patent

UNITED STATES PATENTS

| | | |
|---|---|---|
| D. 160,815 | Scott | Nov. 7, 1950 |
| D. 172,394 | Kenitz | June 8, 1954 |
| 2,525,595 | Fergueson | Oct. 10, 1950 |
| 2,549,124 | Oswald | Apr. 17, 1951 |